United States Patent
Ito

(10) Patent No.: US 11,402,693 B2
(45) Date of Patent: Aug. 2, 2022

(54) SURFACE LIGHT SOURCE DEVICE, DISPLAY DEVICE AND OPTICAL SHEET MANUFACTURING METHOD

(71) Applicant: Funai Electric Co., Ltd., Osaka (JP)

(72) Inventor: Tatsuya Ito, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 17/227,619

(22) Filed: Apr. 12, 2021

(65) Prior Publication Data

US 2021/0349352 A1    Nov. 11, 2021

(30) Foreign Application Priority Data

May 11, 2020    (JP) .............................. JP2020-083012

(51) Int. Cl.
*G02F 1/00* (2006.01)
*G02F 1/13357* (2006.01)
*B60K 35/00* (2006.01)

(52) U.S. Cl.
CPC ........ *G02F 1/133611* (2013.01); *B60K 35/00* (2013.01); *G02F 1/133605* (2013.01); *G02F 1/133606* (2013.01); *B60K 2370/152* (2019.05); *B60K 2370/168* (2019.05); *B60K 2370/40* (2019.05)

(58) Field of Classification Search
CPC .............. B60K 35/00; G02F 1/133606; G02F 1/133605; G02F 1/133611
See application file for complete search history.

(56) References Cited

U.S. PATENT DOCUMENTS

| 2011/0037740 | A1* | 2/2011 | Yamaguchi | G02B 6/0031 345/204 |
| 2012/0188759 | A1* | 7/2012 | Sato | H05B 45/20 362/230 |
| 2015/0124434 | A1* | 5/2015 | Chang | G02F 1/133605 362/97.3 |
| 2016/0259209 | A1* | 9/2016 | Ito | G02B 6/00 |
| 2017/0175956 | A1* | 6/2017 | Chang | G02F 1/133609 |

(Continued)

FOREIGN PATENT DOCUMENTS

JP    2018-37316 A    3/2018

OTHER PUBLICATIONS

The extended European search report for the corresponding European application No. 21172861.3 dated Oct. 7, 2021.

*Primary Examiner* — Gerald J Sufleta, II
(74) *Attorney, Agent, or Firm* — Global IP Counselors, LLP

(57) ABSTRACT

A surface light source device comprises: a plurality of light sources, an optical sheet, and a diffusion plate. The optical sheet includes a transmission part having a plurality of through holes that are configured to transmit light emitted from the light sources, and a reflection part configured to reflect the light emitted from the light sources. The optical sheet is configured such that the through holes include a plurality of first through holes each having a hole diameter set according to a distance from a respective one of the light sources, and at least one second through hole each having a hole diameter set to a different size from the hole diameter set according to the distance from the respective one of the light sources.

21 Claims, 8 Drawing Sheets

(56) References Cited

U.S. PATENT DOCUMENTS

| | | | |
|---|---|---|---|
| 2017/0219882 A1* | 8/2017 | Kang | G02F 1/133611 |
| 2018/0239195 A1* | 8/2018 | Kumamoto | F21S 2/00 |
| 2019/0146279 A1* | 5/2019 | Tanikawa | F21S 2/00 |
| | | | 362/97.2 |
| 2019/0271884 A1* | 9/2019 | Watanabe | G02F 1/133611 |
| 2019/0324323 A1* | 10/2019 | Oh | G02F 1/133611 |
| 2020/0379298 A1* | 12/2020 | Notoshi | G02F 1/133611 |
| 2021/0088852 A1* | 3/2021 | Kim | G02F 1/133605 |

* cited by examiner

SURFACE LIGHT SOURCE DEVICE, DISPLAY DEVICE AND OPTICAL SHEET MANUFACTURING METHOD

CROSS-REFERENCE TO RELATED APPLICATIONS

This application claims priority to Japanese Patent Application No. 2020-083012 filed on May 11, 2020. The entire disclosure of Japanese Patent Application No. 2020-083012 is hereby incorporated herein by reference.

BACKGROUND

Field of the Invention

This invention generally relates to a surface light source device, a display device, and an optical sheet manufacturing method. More specifically, the present invention relates to a surface light source device equipped with a light source and an optical sheet, a display device, and an optical sheet manufacturing method.

Background Information

Generally, a surface light source device equipped with a light source and an optical sheet is known (see Japanese Patent Application Publication No. 2018-37316 (Patent Literature 1), for example).

Patent Literature 1 above discloses an LED backlight that has an LED element and a transmissive reflector with a transmission part. With Patent Literature 1, the transmission part has through holes that increase in number as well as in hole diameter as moving away from the light source in order to make the luminance uniform.

SUMMARY

As disclosed in Patent Literature 1 above, when the hole diameters of the through holes are gradually increased as moving away from the light source in order to make the luminance uniform, there is a problem that concentric luminance unevenness centered on the light source occurs due to the fact that portions with the same hole diameter have the same luminance.

One object of the present disclosure is to provide a surface light source device, a display device, and an optical sheet manufacturing method that can make luminance uniform and suppress the occurrence of luminance unevenness.

In view of the state of the known technology and in accordance with a first aspect of the present invention, a surface light source device comprises a plurality of light sources, an optical sheet, and a diffusion plate. The optical sheet is arranged to face the light sources, the optical sheet including a transmission part having a plurality of through holes that are configured to transmit light emitted from the light sources, and a reflection part configured to reflect the light emitted from the light sources. The diffusion plate is configured to diffuse the light transmitted through the transmission part, the diffusion plate being arranged to face the optical sheet and disposed on an opposite side relative to the light sources. The optical sheet is configured such that the through holes include a plurality of first through holes each having a hole diameter set according to a distance from a respective one of the light sources, and at least one second through hole each having a hole diameter set to a different size from the hole diameter set according to the distance from the respective one of the light sources.

BRIEF DESCRIPTION OF THE DRAWINGS

Referring now to the attached drawings which form a part of this original disclosure.

DETAILED DESCRIPTION OF EMBODIMENTS

Figure 1:
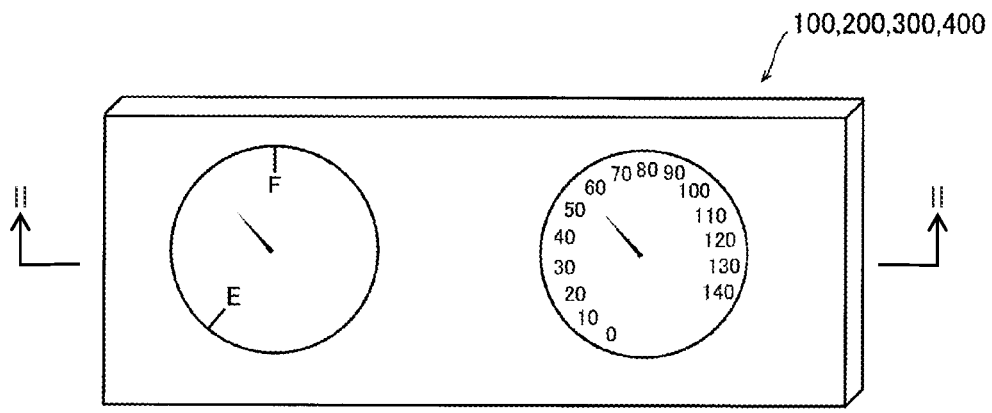
FIG. 1 is a perspective view of an overall configuration of a display device according to a first embodiment.

Selected embodiments will now be explained with reference to the drawings. It will be apparent to those skilled in the display device field from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

First Embodiment (Configuration of Display Device)

Referring to FIGS. 1 to 6, a configuration of a display device 100 according to a first embodiment will be described.

Figure 2:
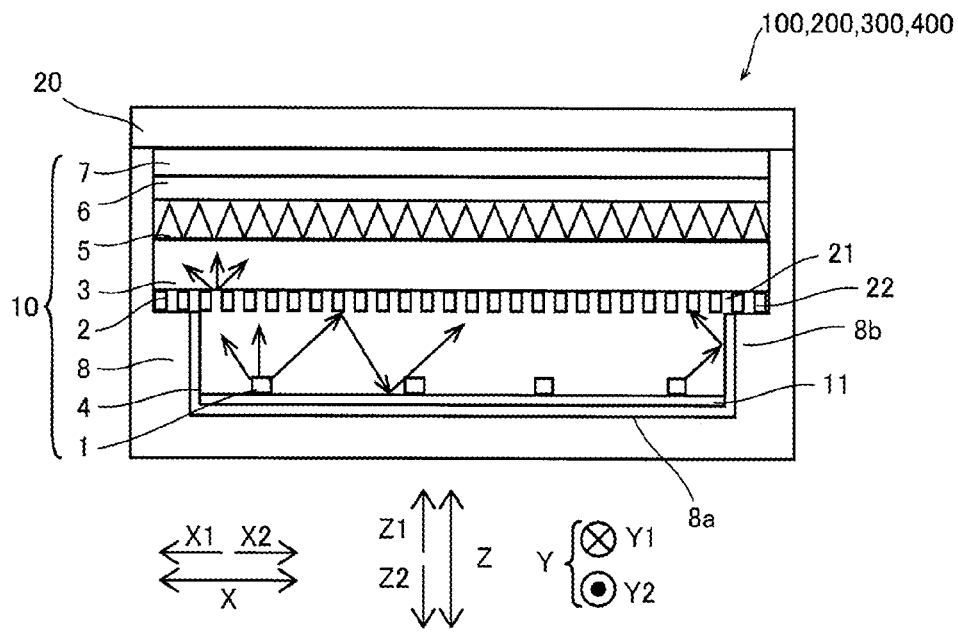
FIG. 2 is a cross-sectional view of the display device according to the first embodiment, taken along II-II line in FIG. 1.

As shown in FIGS. 1 and 2, the display device 100 according to the first embodiment is a digital instrument panel for a vehicle. The display device 100 is generally installed behind the steering wheel at a portion of a dashboard of the vehicle, for example. As shown in FIG. 1, the display device 100 displays images indicating the speedometer and the fuel gauge on a display surface of the display device 100. Of course, the display device 100 can further display other images indicating many other meters, gauges and indicators, such as the tachometer, the odometer, the temperature gauge, the turn signal indicators, the gear display, the warning lights, and the like. In the illustrated embodiment, as shown in FIG. 2, the display device 100 includes a surface light source device 10 and a display 20. FIG. 2 is a cross-sectional view of the display device 100 shown in FIG. 1, taken along an X direction (the II-II line in FIG. 1). In the illustrated embodiment, the horizontal direction and the vertical direction of the display device 100 are referred to as the X direction and a Y direction, respectively, and the thickness or front-to-back direction is referred to as a Z direction. In particular, a leftward direction and a rightward direction of the display device 100 along the X direction are referred to as a X1 direction and a X2 direction, respectively. Also, an upward direction and a downward direction of the display device 100 along the Y direction are referred to as a Y1 direction and a Y2 direction, respectively. Furthermore, a forward direction and a backward direction of the display device 100 along the Z direction are referred to as a Z1 direction and a Z2 direction, respectively.

The surface light source device 10 includes a plurality of light sources 1, an optical sheet 2, and a diffusion plate 3. In the first embodiment, the surface light source device 10 further includes a reflective sheet 4, a prism sheet 5, a polarizing sheet 6, a louver sheet 7, and a frame 8. With the surface light source device 10, the light sources 1, the reflective sheet 4, the optical sheet 2, the diffusion plate 3, the prism sheet 5, the polarizing sheet 6 and the louver sheet 7 are stacked in this order inside the frame 8.

Figure 3:
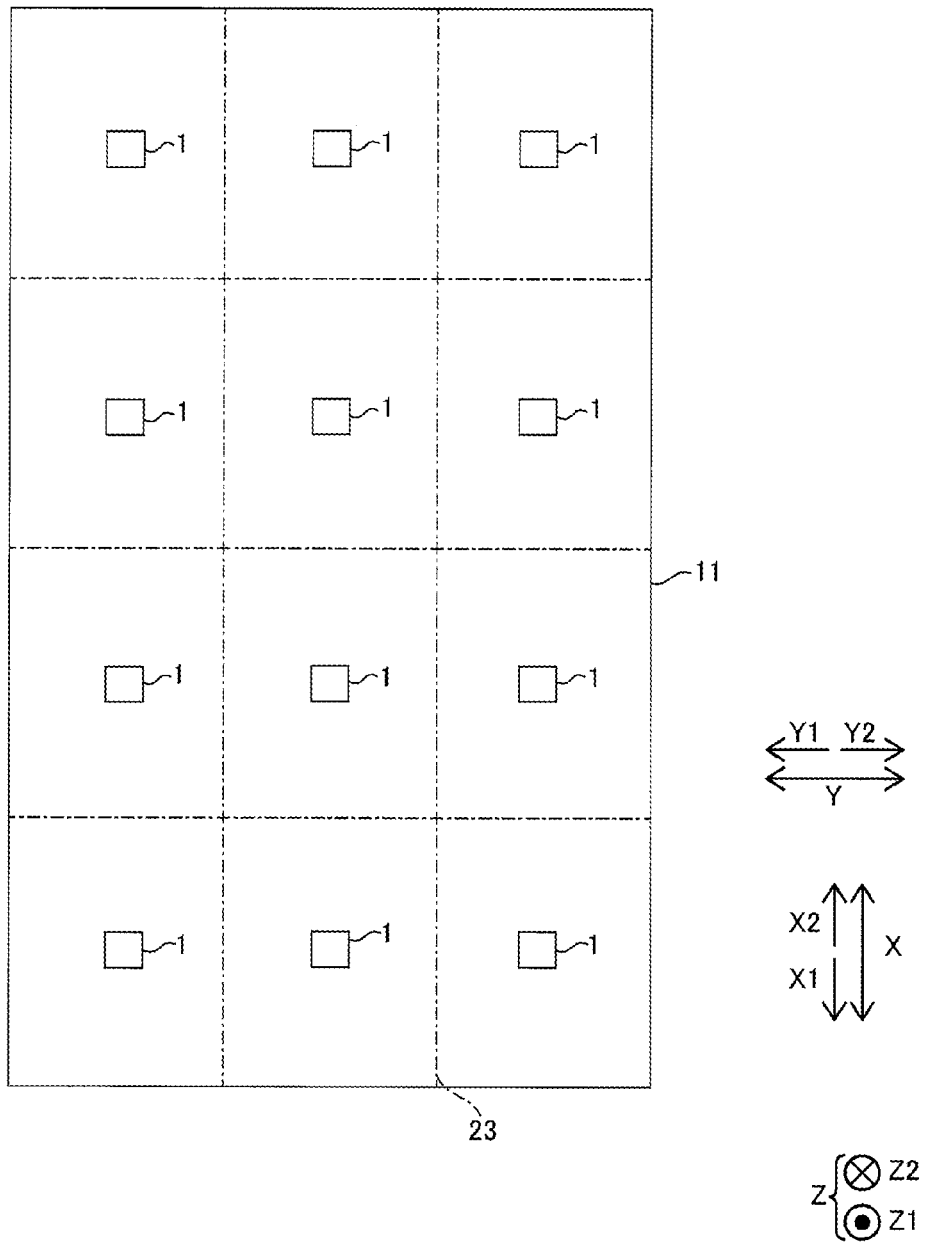
FIG. 3 is a front view of an inner configuration of the display device according to the first embodiment, illustrating an arrangement of a plurality of light sources on a substrate of the display device.

As shown in FIGS. 2 and 3, the light sources 1 are provided on a substrate 11. The light sources 1 each include a light emitting element. The light sources 1 are configured to emit light when energized. In particular, in the illustrated embodiment, the light sources 1 each include an LED (Light Emitting Diode). The light sources 1 are arranged in a matrix or grid pattern in the X direction and the Y direction. As indicated by the arrows in FIG. 2, the light sources 1 emit light radially. In the illustrated embodiment, as shown in FIG. 3, twelve light sources 1 are arranged in a matrix on the substrate 11. Specifically, three light sources 1 are arranged with respect to each other along the X direction, and four light sources 1 are arranged with respect to each other along the Y direction. However, the number of light sources 1 is not limited to this, and can be less than twelve or more than twelve as needed and/or desired.

As shown in FIG. 2, the optical sheet 2 is disposed between the diffusion plate 3 and the light sources 1. The optical sheet 2 includes a transmission part 21 that transmits the light emitted from the light sources 1 and a reflection part 22 that reflects the light emitted from the light source 1. The optical sheet 2 is used to homogenize the luminance. The overall shape of the optical sheet 2 is designed to match the shape of the frame 8. In the first embodiment, the optical sheet 2 is rectangular in shape. The area of the optical sheet 2 is larger than a bottom surface 8a inside the frame 8 and the reflective sheet 4. The optical sheet 2 is disposed on a protruding portion 8b formed on an inner surface of the frame 8.

Figure 4:
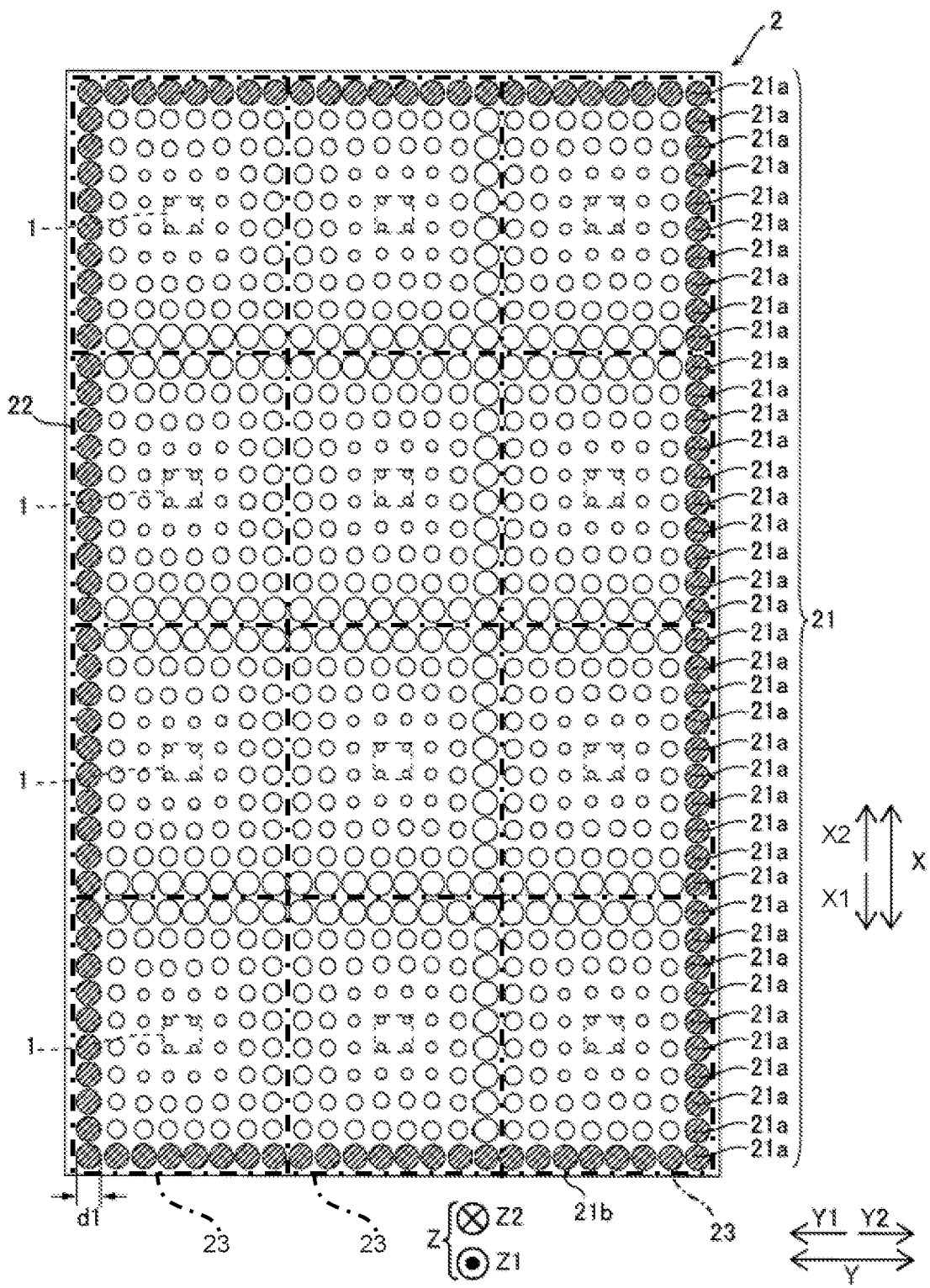
FIG. 4 is a front view of an optical sheet of the display device according to the first embodiment, illustrating an arrangement of a transmission part of the optical sheet.

As shown in FIG. 4, the optical sheet 2 is made of a resin that has the property of reflecting light. The optical sheet 2 is made of, for example, a micro-cellular foam polyethylene terephthalate. The transmission part 21 includes a plurality of through holes 21a. Specifically, the transmission part 21 is provided by making the through holes 21a in the optical sheet 2 with tools, such as a drill. With the optical sheet 2, the through holes 21a are arranged in a matrix. Specifically, as shown in FIG. 4, the through holes 21a are linearly arranged in a direction (the X direction and the Y direction) parallel or perpendicular to a direction in which the light sources 1 are arranged (the X direction and the Y direction). The through holes 21a are provided at constant intervals. Here, FIG. 4 is only utilized to show an overall arrangement of the through holes 21a, and thus the details (e.g., size and position) of the through holes 21a according to the first embodiment will be explained later with reference to FIG. 6.

As shown in FIGS. 2 and 4, the transmission part 21 of the optical sheet 2 includes the through holes 21a that penetrate the optical sheet 2 in the thickness direction (the Z direction). The through holes 21a are provided to form the transmission part 21. The through holes 21a generally have hole diameters d1 that are set according to the distance from the light sources 1, which will be described in detail later. The reflection part 22 of the optical sheet 2 is a remainder part other than where the through holes 21a are provided. Since the light from the light sources 1 is radially diffused and irradiated, a part of the light from the light sources 1 is transmitted through the transmission part 21 (i.e., the through holes 21a) and another part of the light from the light sources 1 is reflected by the reflection part 22 (i.e., a back surface of the optical sheet 2). In the illustrated embodiment, the term "hole diameters d1 of the through holes (21a-21f)" refers to the diameters of the through holes (21a-21f). In the illustrated embodiment, the sizes of the hole diameters d1 are set within the range between 0.35 mm and 0.80 mm, for example. However, the sizes of the hole diameters d1 can be set in a different range, as needed and/or desired.

As shown in FIG. 2, the diffusion plate 3 radially scatters the light transmitted through the transmission part 21 of the optical sheet 2. Therefore, even if there is a difference in the amount of light transmitted through the transmission part 21, the light is scattered by the diffusion plate 3. This makes it possible to homogenizes the luminance. The diffusion plate 3 is made of resin. The diffusion plate 3 is formed, for example, by compounding (mixing and kneading) a diffusing material into polycarbonate. The diffusion plate 3 is rectangular in shape. The lengths of the diffusion plate 3 in the short direction (the Y direction) and the long direction (the X direction) are the same as those of the optical sheet 2.

The reflective sheet 4 reflects the light reflected by the reflection part 22 of the optical sheet 2 back to the optical sheet 2 side. Since the reflective sheet 4 is provided on a side surface of the frame 8 surrounded by the optical sheet 2 and the bottom surface 8a inside the frame 8, the reflective sheet 4 reflects the light emitted from the light source 1 toward the side surface of the frame 8 back to the optical sheet 2. The reflective sheet 4 is smaller than the optical sheet 2. The reflective sheet 4 is made of resin. The reflective sheet 4 is made of a micro-cellular foam resin, for example. The reflective sheet 4 is made of, for example, micro-cellular polyethylene terephthalate. The reflective sheet 4 is rectangular in shape as viewed in the Z direction. The lengths of the reflective sheet 4 in the short direction (the Y direction) and the long direction (the X direction) are smaller than those of the optical sheet 2.

The prism sheet 5 refracts the light scattered by the diffusion plate 3 in a predetermined direction and focuses it. The prism sheet 5 has the shape of a series of triangular prisms arranged in the horizontal direction. The prism sheet 5 is made of acrylic resin, for example. The lengths of the prism sheet 5 in the short direction (the Y direction) and the long direction (the X direction) are the same as those of the optical sheet 2.

The polarizing sheet 6 transmits light with a predetermined orientation or polarization out of the light focused by the prism sheet 5, and reflects the other light. Specifically, the polarizing sheet 6 reflects light with an orientation or polarization that is absorbed in the display 20, and transmits light with an orientation or polarization that is not absorbed. The polarizing sheet 6 is rectangular in shape. The lengths of the polarizing sheet 6 in the short direction (the Y direction) and the long direction (the X direction) are the same as those of the optical sheet 2.

The louver sheet 7 blocks light that enters the louver sheet 7 at an angle out of the light transmitted through the polarizing sheet 6. This prevents images from being displayed on areas other than the display 20, such as the windshield, for example, when the display device 100 is used in a vehicle. The louver sheet 7 is rectangular in shape. The lengths of the louver sheet 7 in the short direction (the Y direction) and the long direction (the X direction) are the same as those of the optical sheet 2.

The frame 8 has a cuboid shape with an opening at the top. The light sources 1 are disposed on the bottom surface 8a inside the frame 8. The frame 8 has the protruding portion 8b that projects inside between the top surface and the bottom surface 8a. Since the optical sheet 2 is disposed on the protruding portion 8b, a space can formed between the optical sheet 2 and the light sources 1 (or between the optical sheet 2 and the reflective sheet 4) that are provided on the bottom surface 8a of the frame 8, and thus the light from the light sources 1 can be sufficiently diffused. The position of the protruding portion 8b is set so that the light from the light sources 1 can be sufficiently diffused. In FIG. 2, the length of the frame 8 in the Z direction is exaggerated. The length of the frame 8 in the Z direction is, for example, 10 mm or less.

The display 20 includes a plurality of pixels, and displays an image by changing the transmittance of the light emitted from the light sources 1 by each of the pixels. The display 20 is driven based on video signal. The display 20 includes a polarizing plate and a liquid crystal cell. By applying a voltage to the liquid crystal cell, the orientation of the liquid crystal molecules is changed and, by combining the orientation of the liquid crystal molecules and the polarizing plate, the transmittance of the light is changed to adjust the luminance. Since polarizing plate has the property of absorbing light in a particular direction, the polarizing sheet 6 is selected to transmit light in a direction that is not absorbed in accordance with the polarizing plate.

(Structure of Optical Sheet)

Figure 6:
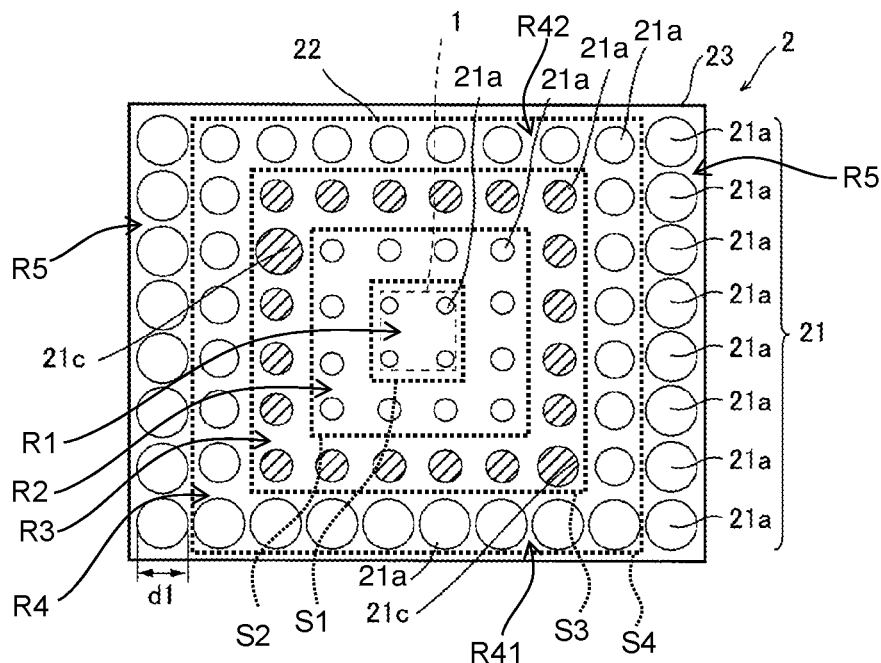
FIG. 6 is an enlarged front view of a section of the optical sheet according to the first embodiment, illustrating an arrangement of through holes in the section of the optical sheet according to a first embodiment.

Referring now to FIGS. 4 and 6, the configuration of the optical sheet 2 will be explained in detail. With the optical sheet 2, the sizes of the hole diameters d1 of the through holes 21a are generally set according to the distance from the light sources 1. Specifically, the sizes of the hole diameters d1 of the through holes 21a are generally configured so that the sizes of the hole diameters d1 increase in steps from a position close to a respective one of the light source 1 to a farther position (an outer edge 21b) on the optical sheet 2. The sizes of the hole diameters d1 depend on the outer diameters of the tools to be used. The sizes of the hole diameters d1, for example, are separated into 18 different levels or steps (18 ranks) in size. Thus, the through holes 21a each have a hole diameter d1 of a size selected from these 18 levels or steps.

Furthermore, in the illustrated embodiment, as shown in FIG. 6, the hole diameter d1 of a portion of the through holes 21a (e.g., at least one second through hole) is set to a different size from the hole diameters d1 of the through holes 21a that are set according to the distance from the respective one of the light sources 1. Specifically, the optical sheet 2 is configured such that, in each of sections 23 of the optical sheet 2 centered on positions of the light sources 1, respectively, the hole diameter d1 of the portion of the through holes 21a is set to be smaller than the hole diameter d1 of an adjacent through hole 21a on the light source 1 side, or is set to be larger than the hole diameter d1 of an adjacent through hole 21a on the outer edge 21b side. In the illustrated embodiment, the sections 23 of the optical sheet 2 centered on the light source 1 are, for example, sections that have the same area equally dividing the optical sheet 2 by the number of the light sources 1. In the illustrated embodiment, as shown in FIGS. 3 and 4, the sections 23 centered on the light sources 1 are provided corresponding to the light sources 1, respectively. Specifically, in the illustrated embodiment, since the display device 100 includes twelve light sources 1, the optical sheet 2 also includes twelve sections 23 corresponding to the twelve light sources 1. In FIGS. 3 and 4, the sections 23 centered on the light sources 1 are shown as a rectangle with a dash-dotted line. In the illustrated embodiment, the optical sheet 2 is configured such that, in each of the sections 23 centered on positions of the light sources 1, respectively, the through holes 21a are arranged relative to each other in a matrix. In particular, as shown in FIGS. 4 and 6, the optical sheet 2 is configured such that, in each of the sections 23, the through holes 21 are arranged in a plurality of (e.g., eight) rows each having the same number (e.g., ten) of through holes 21a and in a plurality of (e.g., ten) columns each having the same number (e.g., eight) of through holes 21a.

As shown by the hatching in FIG. 4, the through holes 21a (e.g., the outer ones of the through holes 21a) that are arranged along the outer edge 21b of the optical sheet 2 have the largest hole diameter d1 among the through holes 21a in the optical sheet 2. Thus, if there are 18 levels of sizes of the hole diameters d1, the largest hole diameter d1 is set to have the largest, eighteenth, level. With the through holes 21a arranged along the outer edge 21b, the sizes of the hole diameters d1 are not changed. Furthermore, as shown in FIGS. 4 and 6, in each of the sections 23 of the optical sheet 2, the through holes 21a that are arranged along an outer edge of each of the sections 23 of the optical sheet 2 also have the largest hole diameter d1 among the through holes 21a in each of the sections 23 of the optical sheet 2. Specifically, as shown in FIGS. 4 and 6, the through holes 21a that are arranged along three outer edges of each of the sections 23 of the optical sheet 2 have the largest hole diameter d1 of the eighteenth level, for example.

The change in the sizes of the hole diameters d1 of the through holes 21a is performed for at least one region in the section 23 that is formed by a plurality of through holes 21a with the same hole diameter d1 set according to the distance from the respective one of the light sources 1. Specifically, the hole diameter d1 of the through holes 21a is changed in order to change the total area of the through holes 21a included in the region. Since the transmittance increases in accordance with the total area of the through holes 21a included in the region, the luminance can be adjusted by adjusting the hole diameter d1 of the through holes 21a so as to achieve the desired total area.

Figure 5:
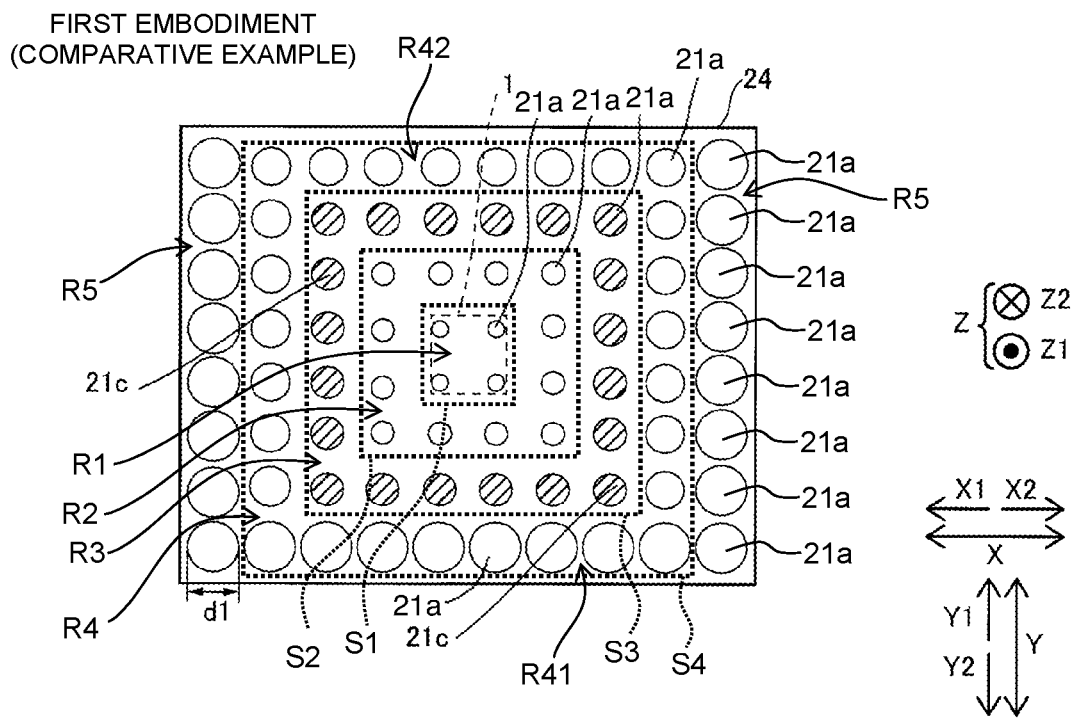
FIG. 5 is an enlarged front view of a section of an optical sheet according to a comparative or modification example of the first embodiment, illustrating an arrangement of through holes in the section of the optical sheet.

Referring now to FIGS. 5 and 6, the method for adjusting the luminance will be explained. FIG. 5 illustrates a comparative example of one of sections of an optical sheet 24. In the first embodiment, the configuration shown in FIG. 5 is referred to as a comparative example. However, this comparative example is also an embodiment of the present invention. In the section of the optical sheet 24 according to the comparative example, the hole diameters d1 of the through holes 21a gradually increase according to the distance from the light source 1.

In particular, as shown in FIG. 5, the section of the optical sheet 24 can be divided into regions R1 to R5 according to the distance from the light source 1 by concentric rectangles or squares S1 to S4 centered on the position of the light source 1. The region R1 is surrounded by the rectangle S1 and is a region directly above the light source 1. The region R1 includes the through holes 21a having the same hole diameter d1, which is the smallest among the through holes 21a in the section of the optical sheet 24. For example, the hole diameter d1 of the through holes 21a in the region R1 has a size of the first level of the 18 levels, for example. Thus, the through holes 21a having the smallest hole diameter among the through holes 21a of the optical sheet 24 are provided in the region R1 directly above the light source 1. Alternatively, the optical sheet 24 can be configured such that no through holes is provided in the region R1 directly above the light source 1.

The region R2 surrounds the region R1 and are defined between the rectangles S1 and S2. The region R2 includes the through holes 21a having the same hole diameter d1, which is larger than the through holes 21a in the region R1 by one or several levels or steps and is smaller than the through holes 21a in the region R3 by one or several levels or steps. For example, the hole diameter d1 of the through holes 21a in the region R2 has a size of the fourth level of the 18 levels, for example. Similarly, the region R3 surrounds the region R2 and are defined between the rectangles S2 and S3. The region R3 includes the through holes 21a having the same hole diameter d1, which is larger than the through holes 21a in the region R2 by one or several levels or steps and is smaller than the through holes 21a in the region R4 by one or several levels or steps. For example, the hole diameter d1 of the through holes 21a in the region R3 has a size of the seventh level of the 18 levels, for example.

Furthermore, the region R4 surrounds the region R3 and are defined between the rectangles S3 and S4. The region R4 includes a first sub-region R41 that linearly extends along an outer edge (e.g., a lower edge in FIG. 5) of the section of the optical sheet 24, and a second sub-region R42 that is a remainder of the first sub-region R41 and have an overall inverted U-shape in FIG. 5. The second sub-region R42 includes the through holes 21a having the same hole diameter d1, which is larger than the through holes 21a in the region R3 by one or several levels or steps and is smaller than the through holes 21a in the region R5 by one or several levels or steps. For example, the hole diameter d1 of the through holes 21a in the second sub-region R42 has a size of the tenth level of the 18 levels, for example. On the other hand, the first sub-region R41 includes the through holes 21a having the same hole diameter d1, which is the largest among the through holes 21a in the section of the optical sheet 24. For example, the hole diameter d1 of the through holes 21a in the first sub-region R41 has a size of the eighteenth level of the 18 levels, for example.

The regions R5 sandwich the region R4 therebetween and are located outside the rectangle S4 along opposite outer edges of the section of the optical sheet 24. The region R5 includes the through holes 21a having the same hole diameter d1, which is larger than the through holes 21a in the second sub-region R42 by one or several levels or steps and is the same as the through holes 21a in the first sub-region R41. For example, the hole diameter d1 of the through holes 21a in the region R5 has a size of the eighteenth level of the 18 levels, for example.

Since the regions R1 to R5 are defined according to the distance from the light source 1, the through holes 21a (e.g., the first through holes) in the regions R1 to R3 and R5 and the second sub-region R42 have the hole diameters d1 set according to the distance from the light source 1. On the other hand, the through holes 21a (e.g., the at least one second through hole) in the first sub-region R41 have the hole diameters d1 set to a different size from the hole diameter d1 of the through holes 21a in the second sub-region R42 that is set according to the distance from the light source 1.

On the other hand, as shown in FIG. 6, the section 23 of the optical sheet 2 has an identical configuration to the section of the optical sheet 24 shown in FIG. 5, except that the section 23 of the optical sheet 2 further includes through holes 21c in the region R3 that have hole diameters d1 (e.g., the second hole diameter) set to a different size from the hole diameter d1 (e.g., the same first hole diameter) that is set according to the distance from the light source 1 (i.e., the hole diameter d1 of the other through holes 21a in the region R3 in FIG. 6 or the hole diameter d1 of the through holes 21c in the region R3 in FIG. 5). Specifically, in the illustrated embodiment, the hole diameters d1 of the through holes 21c are increased by one or several levels or steps relative to the hole diameter d1 of the other through holes 21a in the region R3. For example, the hole diameters d1 of the through holes 21c has a size of the thirteenth or fifteenth level of the 18 levels, for example, while the hole diameter d1 of the other through holes 21a in the region R3 has a size of the seventh level of the 18 levels. Thus, in the illustrated embodiment, the hole diameters d1 of the through holes 21c in the region R3 are larger than the hole diameter d1 of the through holes 21a in the region R3. Of course, the hole diameters d1 of the through holes 21c can be decreased by one or several levels or steps, as needed and/or desired. In this case, the hole diameters d1 of the through holes 21c in the region R3 are smaller than the hole diameter d1 of the through holes 21a in the region R3.

As shown in FIG. 6, since the regions R1 to R5 are defined according to the distance from the light source 1, the through holes 21a (e.g., the first through holes) in the regions R1 to R3 and R5 and the second sub-region R42 have the hole diameters d1 set according to the distance from the light source 1. On the other hand, the through holes 21c (e.g., the at least one second through hole) in the region R3 have the hole diameters d1 set to a different size from the hole diameter d1 of the through holes 21a (e.g., the first through holes) in the region R3 that is set according to the distance from the light source 1. Also, the through holes 21a (e.g., the at least one second through hole) in the first sub-region R41 have the hole diameters d1 set to a different size from the hole diameter d1 of the through holes 21a in the second sub-region R42 that is set according to the distance from the light source 1. Thus, in the illustrated embodiment, the hole diameters d1 of the through holes 21a (e.g., the first through holes) in the regions R1 to R3 and R5 and the second sub-region R42 increase as moving away from the light source 1. On the other hand, in the illustrated embodiment, the hole diameters d1 of the through holes 21c (e.g., the at least one second through hole) in the region R3 is set to be larger than the hole diameter d1 of adjacent through holes 21a in the second sub-region R42 that are adjacent to the through holes 21c on the outer edge side, respectively. Of course, as mentioned above, the hole diameters d1 of the through holes 21c can be decreased by one or several levels or steps, as needed and/or desired. In this case, the hole diameters d1 of the through holes 21c (e.g., the at least one second through hole) in the region R3 can be set to be smaller than the hole diameter d1 of adjacent through holes 21a in the region R2 that are adjacent to the through holes 21c on the light source side, respectively.

Referring further to FIGS. 5 and 6, a case where the luminance of the region R3 of the optical sheet 24 that is also indicated by the hatching is changed (increased) by 3% will be explained. When increasing the luminance by 3%, at least one hole diameter d1 of at least one through holes 21a is changed so that the total area of the through holes 21a is increased by 3%. For example, FIG. 6 shows an example in which the hole diameters d1 of two through holes 21a, which are indicated as the through holes 21c in FIGS. 5 and 6, are changed out of the through holes 21a having the same hole diameter d1 as shown by the hatching in FIG. 5. In particular, as shown in FIG. 6, in the optical sheet 2 according to the first embodiment, the hole diameters d1 of the through holes 21a are changed such that the area of one of the through holes 21c increases by 1% relative to the total area of the through holes 21a included in the region R3 formed by the through holes 21a each having the same hole diameter d1 (i.e., the total area of the through holes 21a included in the region R3 in FIG. 5) and the area of another one of the through holes 21c increases by 2% relative to the total area of the through holes 21a included in the region R3 formed by the through holes 21a each having the same hole diameter d1 (i.e., the total area of the through holes 21a included in the region R3 in FIG. 5). Alternatively, the hole diameters d1 may be changed such that the areas of three through holes 21a in the region R3 each increase by 1% relative to the total area of the through holes 21a included in the region R3 formed by the through holes 21a each having the same hole diameter d1. Also, the hole diameters d1 may be changed such that the area of one through hole 21a increases by 3% relative to the total area of the through holes 21a included in the region R3 formed by the through holes 21a each having the same hole diameter d1. When the hole diameters d1 are increased, the hole diameters d1 are changed to a larger hole diameter d1 by one to three levels, for example, so that the hole diameters d1 are not increased too much.

On the other hand, when reducing the luminance by 3%, at least one hole diameter d1 of at least one through hole 21a is changed so that the total area of the through holes 21a is reduced by 3%. In this case, as in the case of increasing the luminance explained above, the number of the through holes 21a for which the sizes of the hole diameters d1 are changed and the rate of change are not particularly limited. For example, the hole diameters d1 may be changed such that the area of one of the through holes 21a decreases by 1% relative to the total area of the through holes 21a included in a region formed by the through holes 21a each having the same hole diameter d1 and the area of another one of the through holes 21a decreases by 2% relative to the total area of the through holes 21a included in the region formed by the through holes 21a each having the same hole diameter d1. Alternatively, the hole diameters d1 may be changed such that the areas of three through holes 21a in a region formed by the through holes 21a each having the same hole diameter d1 each decrease by 1% relative to the total area of the through holes 21a included in the region. Also, the hole diameters d1 may be changed such that the area of one through hole 21a in a region formed by the through holes 21a each having the same hole diameter d1 decreases by 3% relative to the total area of the through holes 21a included in the region. When the hole diameters d1 are reduced, the hole diameters d1 are changed to a smaller hole diameter d1 by one to three levels, for example, so that the hole diameters d1 are not reduced too much. FIG. 6 shows one of the sections 23 centered on the light sources 1, but the through holes 21a are arranged in the same manner in other sections 23.

Figure 7:
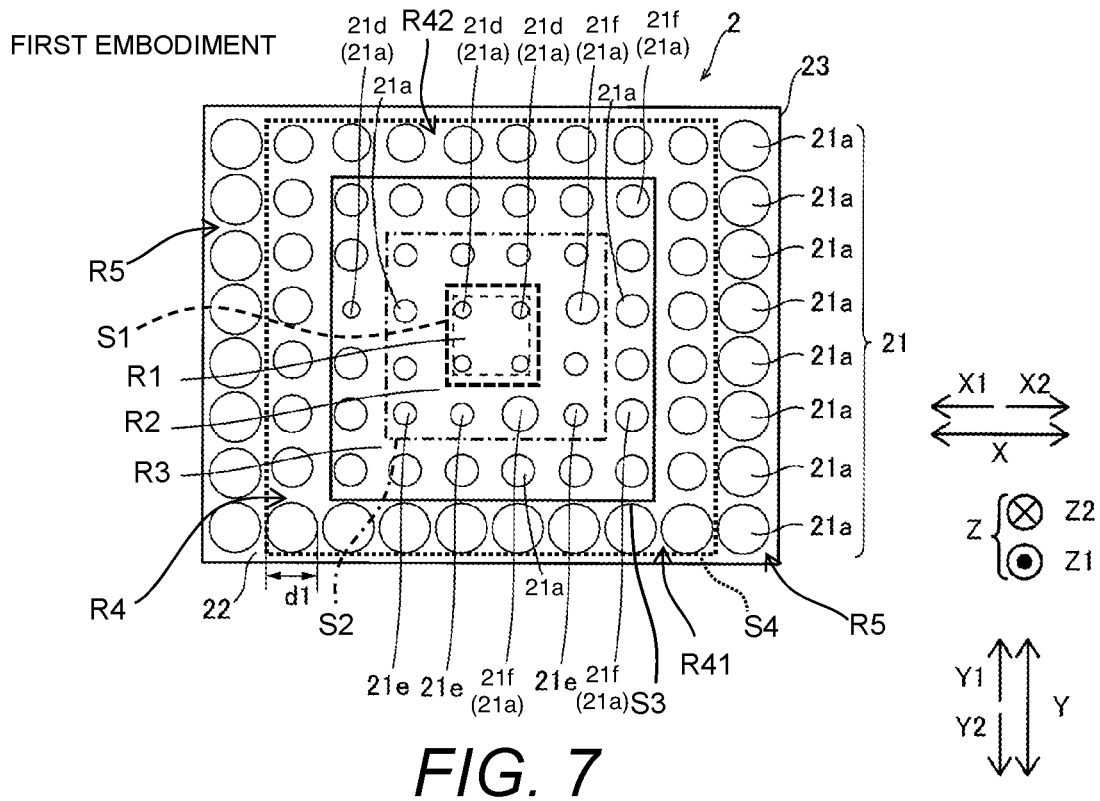
FIG. 7 is an enlarged front view of a section of the optical sheet according to a modification example of the first embodiment, illustrating an arrangement of through holes in the section of the optical sheet according to the modification example of the first embodiment.

FIG. 7 illustrates a section 23 of the optical sheet 2 according to a modification example of the first embodiment. The section 23 of the optical sheet 2 shown in FIG. 7 has an identical configuration to the section of the optical sheet 24 shown in FIG. 5, except for the hole diameters d1 of the through holes 21a in the region R2 and R3 (e.g., through holes 21f in the region R2 and a through hole 21d in the region R3). Specifically, in the illustrated embodiment, the through holes 21f in the region R2 have the hole diameter d1 set to be larger than the hole diameter d1 of the through holes 21a in the region R2 (e.g., through holes 21e in the region R2) that is set according to the distance from the light source 1. In particular, in the illustrated embodiment, the through holes 21f in the region R2 have the same hole diameter d1 as the through holes 21a in the region R3 (e.g., the through holes 21f in the region R3) that is farther from the light source 1 than the region R2. Thus, in this case, the hole diameters d1 of the through holes 21f in the region R2 is set to be the same as the hole diameter d1 of adjacent through holes 21a in the region R3 that are adjacent to the through holes 21f on the outer edge side, respectively. Furthermore, in the illustrated embodiment, the through hole 21d in the region R3 have the hole diameter d1 set to be smaller than the hole diameter d1 of the through holes 21a in the region R3 (e.g., the through holes 21f in the region R3) that is set according to the distance from the light source 1. In particular, in the illustrated embodiment, the through hole 21d in the region R3 has the same hole diameter d1 as the through holes 21a in the region R1 (e.g., the through holes 21d in the region R1) that is closer to the light source 1 than the region R3. Thus, in this case, the hole diameter d1 of the through hole 21d in the region R3 is set to be smaller than the hole diameter d1 of an adjacent through hole 21a in the region R2 that is adjacent to the through hole 21d on the light source side.

Figure 11:
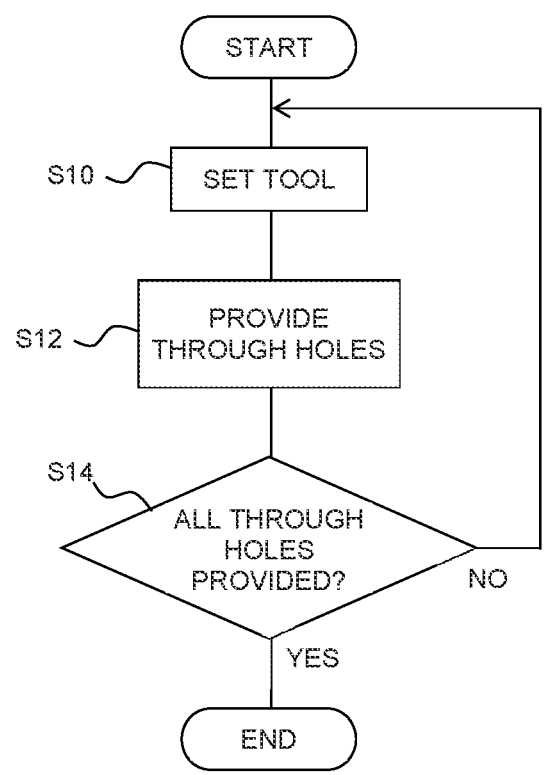
FIG. 11 is a flow chart illustrating how through holes are provided.

Referring further to FIGS. 7 and 11, a manufacturing method of the optical sheet 2 will be explained. In FIG. 7, one of the sections 23 centered on the light sources 1 will be explained, but the same applies to other sections. First, the through holes 21a (e.g., the through holes 21d) having the hole diameter d1 with a first size (e.g., the first level of the 18 levels) are provided in the region R1 with a first tool or drill (step S12 in FIG. 11) after setting the first tool to a manufacturing machine, such as a drilling machine (step S10). Also, the through hole 21d having the hole diameter d1 with the first size is provided in the region R3 with the same first tool. In particular, the through holes 21a having the first size are formed for all of the sections 23 of the optical sheet 2 with the same first tool. The region R1 is surrounded by the rectangular S1 shown by the dashed line, and the through holes 21d in the region R1 have the first size set according to the distance from the light source 1. Also, the region R3 is located between the rectangular S2 shown by the dash-dotted line and the rectangular S3 shown by the solid line, and the through holes 21a (e.g., the through holes 210 in the region R3 have a third size (e.g., the seventh level of the 18 levels) set according to the distance from the light source 1. Next, since all of the through holes 21a have not formed on the optical sheet 2 yet ("NO" in step S14), the drill diameter is changed (step S10). In particular, the first tool is changed to a second tool or drill. Then, the through holes 21a (e.g., the through holes 21e) having the hole diameter d1 with a second size (e.g., the fourth level of the 18 levels) are provided in the region R2 with the second tool (step S12). In particular, the through holes 21a having the second size are formed for all of the sections 23 of the optical sheet 2 with the same second tool. The region R2 is located between the rectangular S1 shown by the dashed line and the rectangular S2 shown by the dash-dotted line, and the through holes 21e in the region R2 have the second size set according to the distance from the light source 1. Since all of the through holes 21a have not been formed on the optical sheet 2 yet ("NO" in step S14), the drill diameter is further changed (step S10). In particular, the second tool is changed to a third tool or drill. Then, the through holes 21a (e.g., the through holes 21f) having the hole diameter d1 with the third size are provided in the regions R3 with the third tool (step S12). Also, the through holes 21f having the hole diameter d1 with the third size are provided in the region R2. Similarly, the through holes 21a having the hole diameters d1 with a fourth size (e.g., the tenth level of the 18 levels) and a fifth size (e.g., the eighteenth level of the 18 levels) are provided in the regions R4 and R5, respectively, by changing tools until all of the through holes 21a have been formed on the optical sheet 2 ("Yes" in step S14). Here, the through holes 21d provided in the region R1, the through holes 21e provided in the region R2, and the through holes 21f provided in the region R3 are examples of the "first through hole" of the present disclosure. Furthermore, the through holes 21f provided in the region R2 and the through hole 21d provided in the region R3 are examples of the "second through hole" of the present disclosure.

Effects of First Embodiment

The following effects can be obtained with the first embodiment.

With the first embodiment, as described above, with the optical sheet 2, the hole diameters d1 of the through holes 21a (e.g., the first through holes) are set according to the distance from the respective one of the light sources 1. This makes it possible to adjust the amount of light transmitted through the transmission part 21 according to the amount of light reaching the transmission part 21, which makes the luminance uniform. Also, by setting the hole diameter d1 of a portion of the through holes 21a (e.g., the at least one second through hole) of the optical sheet 2 to a different size from the hole diameter d1 set according to the distance from the respective one of the light sources 1, the amount of light transmitted through the through holes 21a can be partially changed in a part of each region (e.g., the regions R1 to R5) where the distance from the respective one of the light sources 1 is constant or the same, which makes it less likely to recognize concentric luminance unevenness. As a result, it is possible to provide the display device 100 that can make luminance uniform and suppress the occurrence of luminance unevenness.

With the first embodiment, as described above, the optical sheet 2 is configured such that, in each of the sections 23 of the optical sheet 2 centered on the positions of the light sources 1, respectively, the hole diameters d1 of the through holes 21a (e.g., the first through holes) increase as moving away from the respective one of the light sources 1, and the hole diameter d1 of the portion of the through holes 21a (e.g., the at least one second through hole) is set to be smaller than that of an adjacent through hole 21a on the light source 1 side, or is set to be larger than that of an adjacent through hole 21a on the outer edge 21b side. With this configuration, by providing the through holes 21a such that the hole diameter d1 of the portion of the through holes 21a is set to be smaller than that of the adjacent through hole 21a on the light source 1 side, or is set to be larger than that of the adjacent through hole 21a on the outer edge 21b side, the luminance of a portion of the light transmitted through the transmission part 21 is increased or decreased, which makes it possible to further suppress the occurrence of luminance unevenness.

With the first embodiment, as described above, the optical sheet 2 is configured such that the hole diameter d1 of the portion of the through holes 21a (e.g., the at least one second through hole) is set to a different size from the hole diameters d1 of the through holes 21a set according to the distance from the respective one of the light sources 1 so as to partially change luminance to suppress luminance unevenness. With this configuration, the hole diameter d1 of the portion of the through holes 21a is provided so as to partially change luminance to suppress luminance unevenness, which makes it possible to further suppress the occurrence of luminance unevenness.

With the first embodiment, as described above, the optical sheet 2 is configured such that outer ones of the through holes 21a are arranged along the outer edge 21b of the optical sheet 2 and have the largest hole diameter d1 among the through holes 21a of the optical sheet 2. With this configuration, the hole diameters d1 of the outer ones of the through holes 21a arranged along the outer edge 21b of the optical sheet 2, where the distance from the respective one of the light sources 1 is large and the luminance tends to be smaller than in other regions, can be maximized, and thus the light emitted from the light sources 1 can be easily transmitted and the luminance at the outer edge 21b can be increased. As a result, the luminance can be made more uniform.

With the first embodiment, the optical sheet manufacturing method comprises providing, using the first tool, the first through holes having the hole diameters d1 set according to the distance from the position where the respective one of the light sources 1 is located. This makes it possible to provide the through holes 21a (e.g., the first through holes) whose hole diameters d1 are adjusted according to the amount of light reaching the transmission part 21 of the optical sheet 2 to the optical sheet 2, and thus makes it possible to manufacture the optical sheet 2 with uniform luminance. Furthermore, by comprising providing, using the second tool, the portion of the through holes 21a (e.g., the at least one second through hole) having the hole diameter d1 set to a different size from the hole diameters d1 set according to the distance from the position where the respective one of the light sources 1 is located, it is possible to provide the through hole 21a with a luminance that differs from a luminance of the surrounding area only in a part of each regions (e.g., the regions R1 to R5) where the distance from the respective one of the light sources 1 is constant or the same, and thus it is possible to manufacture the optical sheet 2 on which concentric luminance unevenness less likely occurs. As a result, it is possible to manufacture the optical sheet 2 that can make luminance uniform and suppress the occurrence of luminance unevenness.

Second Embodiment

Referring to FIGS. 1 to 4 and 8, the configuration of an optical sheet 12 of a display device 200 according to a second embodiment will be explained. In view of the similarity between the first and second embodiments, the parts of the second embodiment that are similar or identical to the parts of the first embodiment will be given the same reference numerals as the parts of the first embodiment. Moreover, the descriptions of the parts of the second embodiment that are similar or identical to the parts of the first embodiment may be omitted for the sake of brevity. In the second embodiment, unlike the first embodiment, with the optical sheet 12, a portion of the through holes 21a (e.g., at least one second through hole) is provided by shifting a position.

Figure 8:
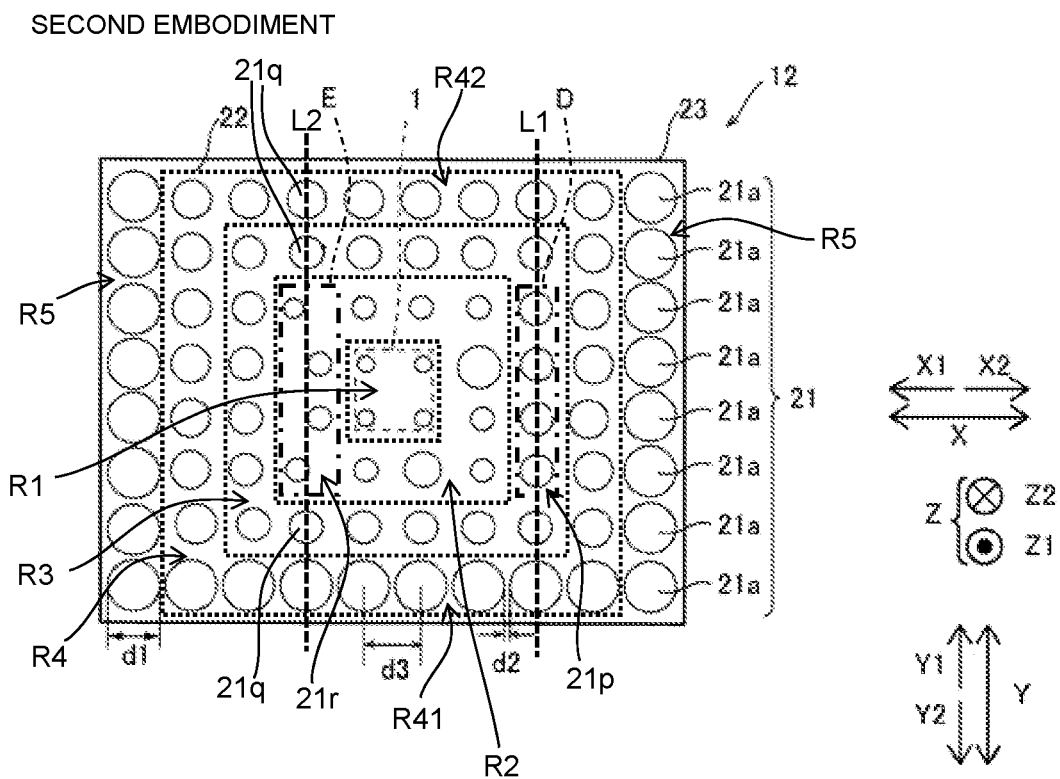
FIG. 8 is an enlarged front view of a section of an optical sheet according to a second embodiment, illustrating an arrangement of through holes in the section of the optical sheet according to the second embodiment.

As shown in a sub-region D in the region R3 of the optical sheet 12, which is surrounded by the dash-dotted line in FIG. 8, at least some of the through holes 21a (e.g., first through holes), which are indicated as through holes 21p, are linearly arranged in a direction (the Y direction) parallel or perpendicular to a direction (the Y direction or the X direction) in which the light sources 1 are arranged. Specifically, as shown in FIG. 8, the through holes 21p in the sub-region D are arranged along a straight line L1 extending in the Y direction. More specifically, the through holes 21p are arranged along the straight line L1 such that the centers of the through holes 21p are aligned along the straight line L1. Similarly, in the illustrated embodiment, at least some of the through holes 21a, which are included in different regions of the optical sheet 12, are also linearly arranged relative to each other in the direction parallel or perpendicular to the direction in which the light sources 1 are arranged. Specifically, as shown in FIG. 8, the through holes 21a, which are indicated as through holes 21q and are included in different regions R3 and R4, are linearly arranged relative to each other along a straight line L2 extending in the Y direction. More specifically, the through holes 21q are arranged along the straight line L2 such that the centers of the through holes 21q are aligned along the straight line L2.

On the other hand, as also shown in a sub-region E in the region R2 of the optical sheet 12, which is surrounded by the dash-dotted line in FIG. 8, a portion of the through holes 21a (e.g., at least one second through hole), which are indicated as through holes 21r, is provided by shifting a position so as to be arranged in a curved shape or a V-shape from a state of the through holes 21a being linearly arranged. Specifically, the through holes 21r in the sub-region E are arranged in a curved shape or a V-shape relative to each other, and are offset with respect to the straight line L2 along which the through holes 21q are arranged. More specifically, the through holes 21r are offset with respect to the straight line L2 such that the centers of the through holes 21r are offset with respect to the straight line L2. In particular, some of the through holes 21r can be entirely offset with respect to the straight line L2 so as not to overlap with the straight line L2, and the remainder of the through holes 21r can be offset with respect to the straight line L2 such that the centers of the through holes 21r are offset with respect to the straight line L2 while the through holes 21r overlap with the straight line L2.

In the illustrated embodiment, the through holes 21a are shifted such that the spacing between adjacent through holes 21a is maintained above a predetermined length or interval. For example, in the illustrated embodiment, the size of the spacing d2 between adjacent through holes 21a at the position where the adjacent holes 21a are closest to each other is set to be 0.2 mm or more. In this case, if the size of the radius of one of the adjacent through holes 21a is 0.3 mm and the size of the radius of the other one of the adjacent through holes 21a is 0.4 mm, then the size of the spacing d3 is set to 0.9 mm or more to ensure the size of the spacing d2 of 0.2 mm or more. The hole diameter d1 of the shifted through holes 21a (e.g., the through holes 21r) may be changed in size. The position and number of through holes 21a to be shifted are selected as needed and/or desired. FIG. 8 shows one of the sections 23 centered on the light sources 1, but the through holes 21a are also arranged in the same manner in other sections 23.

The other configuration of the second embodiment is the same as the first embodiment above.

Effect of Second Embodiment

With the second embodiment, as in the first embodiment above, with the optical sheet 12, the hole diameters d1 of the through holes 21a (e.g., the first through holes) are set according to the distance from the respective one of the light sources 1. This makes it possible to adjust the amount of light transmitted through the transmission part 21 according to the amount of light reaching the transmission part 21, which makes the luminance uniform. Also, by setting the hole diameter d1 of a portion of the through holes 21a (e.g., the at least one second through hole) of the optical sheet 12 to a different size from the hole diameter d1 set according to the distance from the respective one of the light sources 1, the amount of light transmitted through the through holes 21a can be partially changed in a part of each region where the distance from the respective one of the light sources 1 is constant or the same, which makes it less likely to recognize concentric luminance unevenness. As a result, it is possible to provide the display device 200 that can make luminance uniform and suppress the occurrence of luminance unevenness.

With the second embodiment, as described above, the light sources 1 are arranged relative to each other in a matrix, and the optical sheet 12 is configured such that the through holes 21a (the through holes 21q) (e.g., the first through holes) are arranged along the straight line L2 in a direction parallel or perpendicular to a direction in which the light sources 1 are arranged, and such that the portion of the through holes 21a (e.g., the at least one second through hole) includes the through holes 21r that are arranged in a curved shape or a V-shape and are offset with respect to the straight line L2 along which the through holes 21a (the through holes 21q) are arranged. With this configuration, the through holes 21a (the through holes 21p and 21q) are arranged along the straight lines L1 and L2 in the direction parallel or perpendicular to the direction in which the light sources 1 are arranged, which makes it possible to uniformly transmit the light emitted from the light sources 1 over a wide range. Furthermore, the portion of the through holes 21a (the through holes 21r) are arranged in the curved shape or the V-shape and is offset with respect to the straight line L2 along which the through holes 21q are arranged, which generates areas in which the spacings between the through holes 21a change on the optical sheet 12. Thus, an area with narrower spacing can be made brighter, while an area with wider spacing can be made darker. With this configuration, the luminance unevenness is less likely visually recognized due to the partial change in luminance, which makes it possible to suppress the occurrence of the luminance unevenness compared to a case where the through holes 21a are evenly spaced.

The other effects of the second embodiment are the same as the first embodiment.

Third Embodiment

Referring to FIGS. 1 to 4 and 9, the configuration of an optical sheet 32 of a display device 300 according to a third embodiment will be explained. In view of the similarity between the first and third embodiments, the parts of the third embodiment that are similar or identical to the parts of the first embodiment will be given the same reference numerals as the parts of the first embodiment. Moreover, the descriptions of the parts of the third embodiment that are similar or identical to the parts of the first embodiment may be omitted for the sake of brevity. In the third embodiment, the optical sheet 32 is configured such that a ratio of the through holes 21a per unit area in a region directly above the light source 1 is smaller than a ratio of the through holes 21a per unit area in a region other than the region directly above the light source 1.

Figure 9:
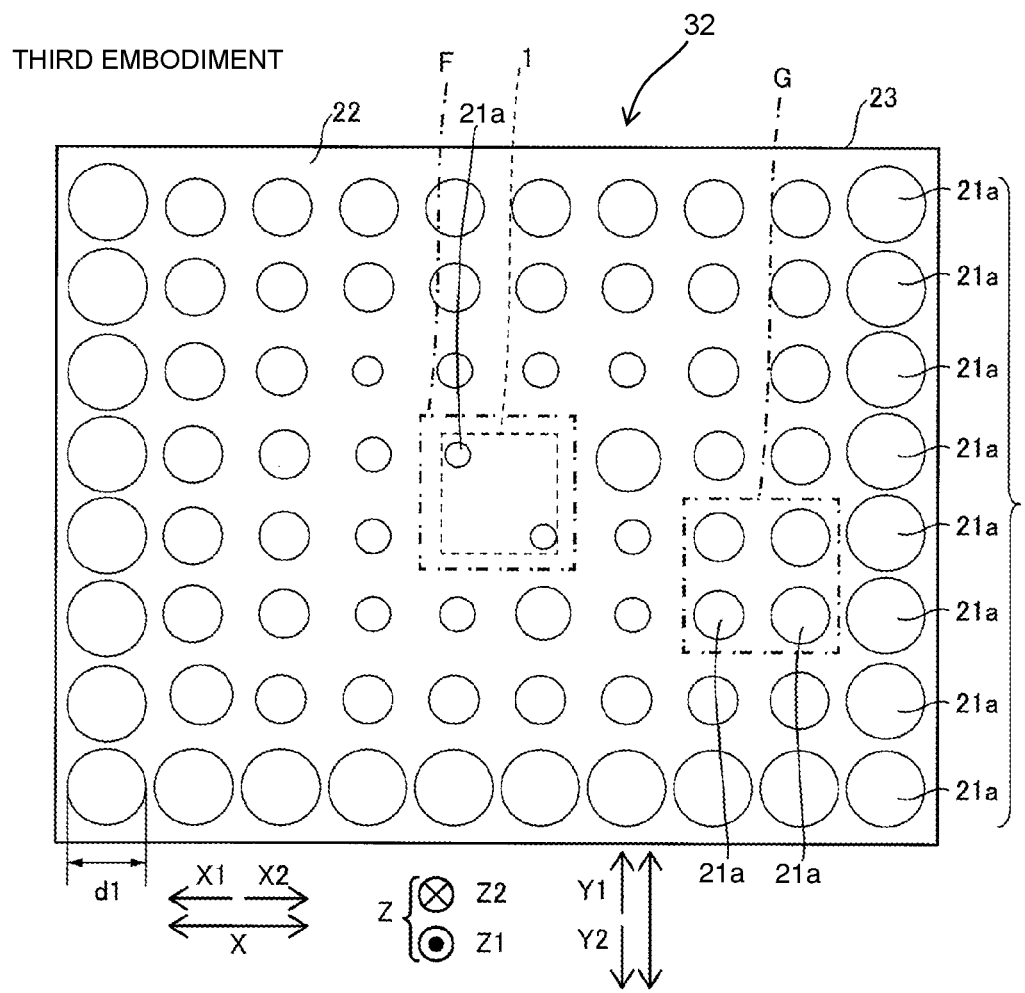
FIG. 9 is an enlarged front view of a section of an optical sheet according to a third embodiment, illustrating an arrangement of through holes in the section of the optical sheet according to the third embodiment.

As shown in FIG. 9, in the third embodiment, a ratio of the through holes 21a per unit area in a region F that is surrounded by the dash-dotted line and directly above the light source 1 is smaller than a ratio of the through holes 21a per unit area in a region G other than the region R directly above the light source 1. For example, in the region F directly above the light source 1, two through holes 21a are provided per unit area, whereas in the region G not directly above the light source 1, four through holes 21a are provided. In the illustrated embodiment, the regions F and G are defined as regions having the same area (or unit area). Furthermore, the two through holes 21a in the region F have the hole diameter d1 that is smaller than the four through holes 21a in the region G. In FIG. 9, one of the sections 23 centered on the light sources 1 is explained, but the through holes 21a are arranged in the same manner in other sections 23. In the illustrated embodiment, the hole diameters d1 of the through holes 21a in the region F directly above the light source 1 are designed to be smaller than the other through holes 21a. For example, if there are 18 levels of sizes of the hole diameters d1, the hole diameters d1 of the through holes 21a in the region F are set to have a size between the first level to the third level.

The other configuration of the third embodiment is the same as the first embodiment above.

Effect of Third Embodiment

With the third embodiment, as in the first embodiment above, with the optical sheet 32, the hole diameters d1 of the through holes 21a (e.g., the first through holes) are set according to the distance from the respective one of the light sources 1. This makes it possible to adjust the amount of light transmitted through the transmission part 21 according to the amount of light reaching the transmission part 21, which makes the luminance uniform. Also, by setting the hole diameter d1 of a portion of the through holes 21a (e.g., the at least one second through hole) of the optical sheet 32 to a different size from the hole diameter d1 set according to the distance from the respective one of the light sources 1, the amount of light transmitted through the through holes 21a can be partially changed in a part of each region where the distance from the respective one of the light sources 1 is constant or the same, which makes it less likely to recognize concentric luminance unevenness. As a result, it is possible to provide the display device 300 that can make luminance uniform and suppress the occurrence of luminance unevenness.

With the third embodiment, as described above, the optical sheet 32 is configured such that the ratio of the through holes 21a per unit area in the region F directly above the respective one of the light sources 1 is smaller than the ratio of the through holes 21a per unit area in the region G other than the region F directly above the respective one of the light sources 1. The hole diameters d1 of the through holes 21a are designed to be smaller in the region F directly above the respective one of the light sources 1 due to the fact that the amount of the light reaching there tends to be larger and the luminance there tends to be higher than the other region G, and thus the transmittance (light transmittance) of the region F directly above the respective one of the light sources 1 can be decreased by decreasing the ratio of the through holes 21a per unit area. As a result, by decreasing the transmittance of the region F directly above the respective one of the light sources 1, it is possible to suppress the luminance from being larger than the other region G, thus making the luminance more uniform.

The other effects of the third embodiment are the same as the first embodiment.

Fourth Embodiment

Referring to FIGS. 1 to 4 and 10, the configuration of an optical sheet 42 of a display device 400 according to a fourth embodiment will be explained. In view of the similarity between the first and fourth embodiments, the parts of the fourth embodiment that are similar or identical to the parts of the first embodiment will be given the same reference numerals as the parts of the first embodiment. Moreover, the descriptions of the parts of the fourth embodiment that are similar or identical to the parts of the first embodiment may be omitted for the sake of brevity. In the fourth embodiment, unlike the first embodiment, a hole diameter d1 of a portion of the through holes 21a are mutually interchanged with a hole diameter d1 of a through hole 21a that differs in size by one or several levels or steps.

Figure 10:
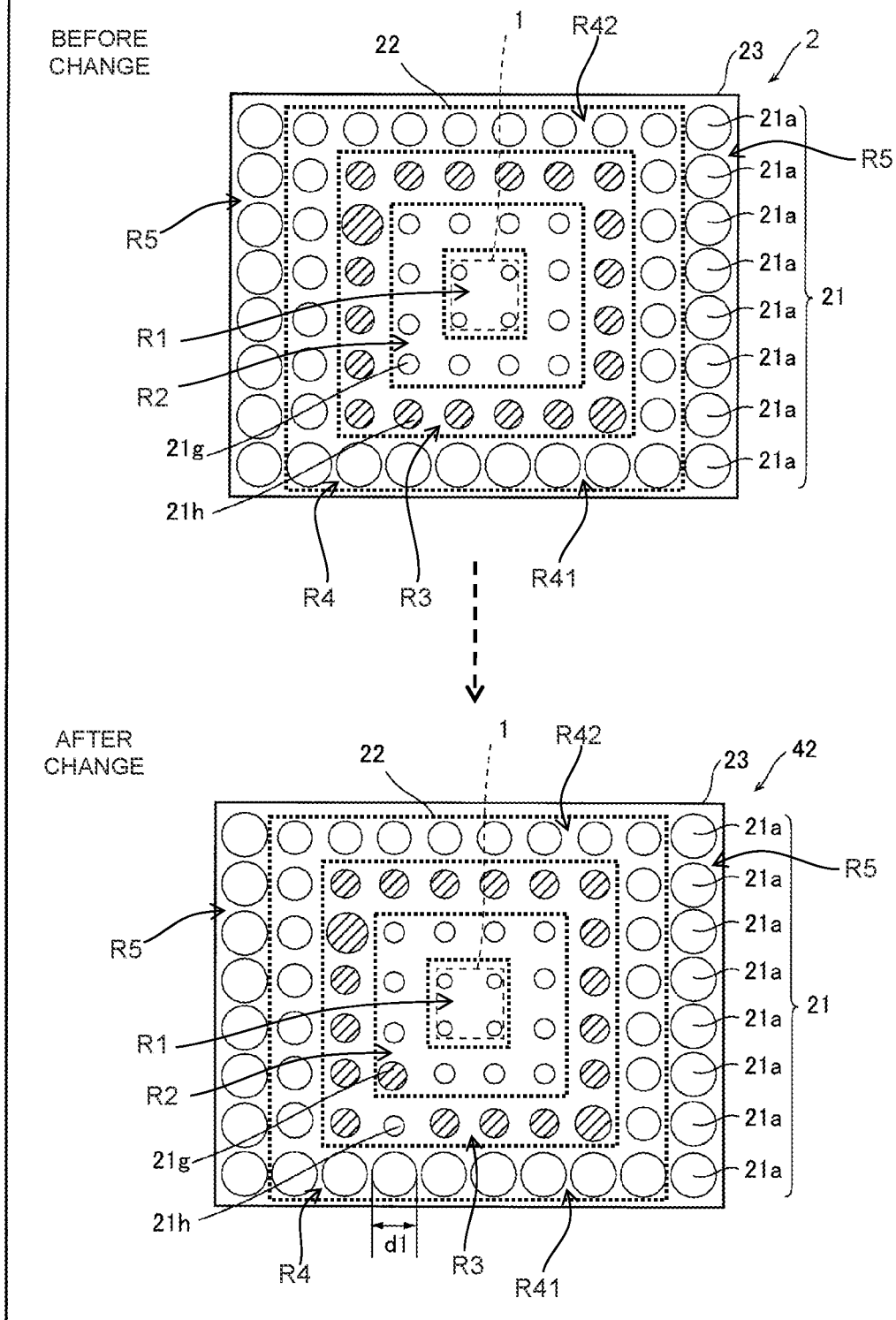
FIG. 10 is an enlarged front view of a section of an optical sheet according to a fourth embodiment, illustrating how an arrangement of through holes according to the fourth embodiment is changed from the arrangement of the through holes shown in FIG. 6.

As shown in FIG. 10, in the fourth embodiment, the positions of a portion of the through holes 21a in the optical sheet 2 according to the first embodiment (FIG. 6), in which the sizes of the through holes 21a are adjusted, are further interchanged with each other. In particular, the optical sheet 2 in which hole diameters d1 of a portion of the through holes 21a have been changed is indicated as BEFORE CHANGE in an upper part of FIG. 10, while the optical sheet 42 in which positions of adjacent through holes 21g and 21h have been interchanged with each other is indicated as AFTER CHANGE in a lower part of FIG. 10. The through holes 21a to be interchanged are selected according to the distance from the respective one of the light source 1 or the rate of adjustment of the amount of light. Thus, in the illustrated embodiment, the through holes 21a includes a pair of the through holes 21g and 21h (e.g., a pair of second through holes), as shown in the lower part of FIG. 10 (AFTER CHANGE), that are formed by mutually interchanging a pair of through holes 21g and 21h, as shown in the upper part of FIG. 10 (BEFORE CHANGE), with hole diameters that are different from each other by one or several levels or steps. Specifically, the through hole 21g in the region R2 and the through hole 21h in the region R3, as shown in the upper part of FIG. 10 (BEFORE CHANGE), are changed to the through hole 21h in the region R3 and the through hole 21g in the region R2, respectively, as shown in the lower part of FIG. 10 (AFTER CHANGE). Since the through holes 21g and 21h, as shown in the upper part of FIG. 10 (BEFORE CHANGE), have the hole diameters d1 set according to the distance from the respective one of the light sources 1 (i.e., the hole diameters d1 set for the regions R2 and R3), the through holes 21g and 21h, as shown in the lower part of FIG. 10 (AFTER CHANGE), are formed by mutually interchanging the through holes 21g and 21h, as shown in the upper part of FIG. 10 (BEFORE CHANGE), having the hole diameters d1 that are set according to the distance from the respective one of the light sources 1 and are different from each other by one or several levels.

The other configurations of the fourth embodiment are the same as the first embodiment above.

Effect of Fourth Embodiment

With the fourth embodiment, as in the first embodiment above, with the optical sheet 42, the hole diameters d1 of the through holes 21a (e.g., the first through holes) are set according to the distance from the respective one of the light sources 1. This makes it possible to adjust the amount of light transmitted through the transmission part 21 according to the amount of light reaching the transmission part 21, which makes the luminance uniform. Also, by setting the hole diameter d1 of a portion of the through holes 21a (e.g., the at least one second through hole) of the optical sheet 42 to a different size from the hole diameter d1 set according to the distance from the respective one of the light sources 1, the amount of light transmitted through the through holes 21a can be partially changed in a part of each region where the distance from the respective one of the light sources 1 is constant or the same, which makes it less likely to recognize concentric luminance unevenness. As a result, it is possible to provide the display device 400 that can make luminance uniform and suppress the occurrence of luminance unevenness.

With the fourth embodiment, as described above, with the optical sheet 42, the hole diameter d1 of the portion of the through holes 21a (the through hole 21g) is mutually interchanged with a hole diameter d1 of a through hole 21a (the through hole 21h) that differs in size by one or several levels or steps. With this configuration, by mutually interchanging the hole diameter d1 of the portion of the through holes 21a (the through hole 21g) with the hole diameter d1 of the through hole 21a (the through hole 21h) that differs in size by one or several levels or steps, the amount of the light transmitted through the through holes 21a can be partially changed, which makes it possible to suppress the occurrence of the luminance unevenness.

Other effects of the fourth embodiment are the same as those of the first embodiment.

Modification Example

The embodiments disclosed here are illustrative and are not restrictive in all respects. The scope of the invention is indicated by the claims rather than by the description of the embodiments described above, and furthermore includes all modifications (modification examples) within the meaning and scope of the claims and their equivalents.

For example, in the first to fourth embodiments above, an example of a display device used in a digital instrument panel for a vehicle is shown, but the present invention is not limited to this. For example, the present invention may be applied to a general display device, such as a liquid crystal television device or a display device for PCs (Personal Computers).

In the first to fourth embodiments above, an example is shown in which the through holes are provided such that the hole diameter of the portion of the through holes is set to be smaller than that of the adjacent through hole on the light source side, or is set to be larger than that of the adjacent through hole on the outer edge side, but the present invention is not limited to this. For example, the hole diameter of the portion of the through holes may be the same size as a hole diameter of an adjacent through hole on the light source side or the outer edge side.

In the first to fourth embodiments above, an example is shown in which the through holes arranged along the outer edge of the optical sheet are set to have the size of the eighteenth level when there are 18 levels of sizes of the hole diameters, but the present invention is not limited to this. For example, the through holes along the outer edge may be provided with a size of the sixteenth level, and the other through holes in the other portion may be provided with a size of the fifteenth level or smaller.

In the first to fourth embodiments above, an example is shown in which the prism sheet, the polarizing sheet and the louver sheet are provided, but the present invention is not limited to this. For example, these components may not be provided.

In the first to fourth embodiments above, an example is shown in which the frame is rectangular in shape and the optical sheet, the reflective sheet, the polarizing sheet and the louver sheet are rectangular in shape, but the present invention is not limited to this. For example, the frame may be cylindrical or tubular in shape, and the optical sheet, the reflective sheet, the polarizing sheet and the louver sheet may be circular or ring in shape. Furthermore, the frame may be semicircular in shape, and the optical sheet, the reflective sheet, the polarizing sheet and the louver sheet may be semicircular in shape.

In the second embodiment above, an example is shown in which the light sources are arranged in a matrix or grid pattern, and with the optical sheet, the portion of the through holes is provided by shifting a position so as to be arranged in a curved shape or a V-shape from a state of the through holes being linearly arranged, but the present invention is not limited to this. For example, the light sources may be provided by shifting positions so as to be arranged in a curved shape or a V-shape from a state of being linearly arranged, and with the optical sheet, the portion of the through holes may be linearly arranged.

In the third embodiment above, an example is shown in which the optical sheet is configured such that the ratio of the through holes per unit area in the region directly above the light source is smaller than the ratio of the through holes per unit area in the region other than the region directly above the light source, but the present invention is not limited to this. For example, the optical sheet can be configured such that no through hole is provided in the region directly above the light source.

In the fourth embodiment above, an example is shown in which, with the optical sheet, adjacent through holes are interchanged with each other, but the present invention is not limited to this. For example, non-adjacent through holes having different hole diameters may be interchanged with each other.

In the first to fourth embodiment, an example is shown in which the optical sheet is configured such that the sections of the optical sheet have the same configuration of the through holes. However, the optical sheet can also be configured such that the sections of the optical sheet have different configurations relative to each other. In particular, the configurations of the through holes shown in FIGS. 5 to 10 can be selectively and mixedly provided in one optical sheet.

In the first to fourth embodiment, an example is shown in which the through holes are arranged in a matrix. However, the through holes can be differently arranged. For example, the through holes can be arranged along concentric circles with different diameter centered on a position of the light source. In this case, the regions R1 to R5 for each of which a hole diameter is set according to the distance from the light source can be defined by a closed polygons or circles other than the concentric rectangles S1 to S4. For example, these regions (R1 to R5) can be defined by concentric circles (or concentric polygons) with different diameter (dimension) centered on a position of the light source.

(1) In view of the state of the known technology and in accordance with a first aspect of the present invention, a surface light source device comprises a plurality of light sources, an optical sheet, and a diffusion plate. The optical sheet is arranged to face the light sources, the optical sheet including a transmission part having a plurality of through holes that are configured to transmit light emitted from the light sources, and a reflection part configured to reflect the light emitted from the light sources. The diffusion plate is configured to diffuse the light transmitted through the transmission part, the diffusion plate being arranged to face the optical sheet and disposed on an opposite side relative to the light sources. The optical sheet is configured such that the through holes include a plurality of first through holes each having a hole diameter set according to a distance from a respective one of the light sources, and at least one second through hole each having a hole diameter set to a different size from the hole diameter set according to the distance from the respective one of the light sources.

With this surface light source device, the hole diameter of the first through holes is set according to the distance from the respective one of the light sources. This makes it possible to adjust the amount of light transmitted through the transmission part according to the amount of light reaching the transmission part, which makes the luminance uniform. Also, by setting the hole diameter of the at least one second through hole of the optical sheet to a different size from the hole diameter set according to the distance from the respective one of the light sources, the amount of light transmitted through the through holes can be partially changed in a part of a region where the distance from the light source is constant or the same, which makes it less likely to recognize concentric luminance unevenness. As a result, it is possible to provide the surface light source device that can make luminance uniform and suppress the occurrence of luminance unevenness.

(2) In accordance with a preferred embodiment according to the surface light source device mentioned above, the optical sheet is configured such that, in each of sections of the optical sheet centered on positions of the light sources, respectively, the hole diameter of the first through holes increases as moving away from the respective one of the light sources, and the hole diameter of the at least one second through hole is set to be smaller than that of an adjacent through hole on a light source side, or is set to be larger than that of an adjacent through hole on an outer edge side. With this configuration, by providing the at least one second through hole such that the hole diameter of the at least one second through hole is set to be smaller than that of the adjacent through hole on the light source side, or is set to be larger than that of the adjacent through hole on the outer edge side, the luminance of a portion of the light transmitted through the transmission part is increased or decreased, which makes it possible to further suppress the occurrence of luminance unevenness.

(3) In accordance with a preferred embodiment according to any one of the surface light source devices mentioned above, the optical sheet is configured such that the hole diameter of the at least one second through hole is set to a different size from the hole diameter set according to the distance from the respective one of the light sources so as to partially change luminance to suppress luminance unevenness. With this configuration, the hole diameter of the at least one second through hole is provided so as to partially change luminance to suppress luminance unevenness, which makes it possible to further suppress the occurrence of luminance unevenness.

(4) In accordance with a preferred embodiment according to any one of the surface light source devices mentioned above, the optical sheet is configured such that outer ones of the through holes are arranged along an outer edge of the optical sheet and have the largest hole diameter among the through holes of the optical sheet. With this configuration, the hole diameter of the outer ones of the through holes arranged along the outer edge of the optical sheet, where the distance from the respective one of the light sources is large and the luminance tends to be smaller than in other regions, can be maximized, and thus the light emitted from the light sources can easily transmitted and the luminance at the outer edge can be increased. As a result, the luminance can be made more uniform.

(5) In accordance with a preferred embodiment according to any one of the surface light source devices mentioned above, the light sources are arranged relative to each other in a matrix, and the optical sheet is configured such that the first through holes are arranged along a straight line in a direction parallel or perpendicular to a direction in which the light sources are arranged, and such that the at least one second through hole includes a plurality of second through holes that are arranged in a curved shape or a V-shape and are offset with respect to the straight line along which the first through holes are arranged. With this configuration, the first through holes are arranged along the straight line in the direction parallel or perpendicular to the direction in which the light sources are arranged, which makes it possible to uniformly transmit the light emitted from the light sources over a wide range. Furthermore, the second through holes are arranged in the curved shape or the V-shape and are offset with respect to the straight line along which the first through holes are arranged, which generates areas in which the spacings between the through holes change on the optical sheet. Thus, an area with narrower spacing can be made brighter, while an area with wider spacing can be made darker. With this configuration, the luminance unevenness is less likely visually recognized due to the partial change in luminance, which makes it possible to suppress the occurrence of the luminance unevenness compared to a case where the through holes are evenly spaced.

(6) In accordance with a preferred embodiment according to any one of the surface light source devices mentioned above, the first through holes are arranged along the straight line such that centers of the first through holes are aligned along the straight line, and the second through holes are offset with respect to the straight line such that centers of the second through holes are offset with respect to the straight line.

(7) In accordance with a preferred embodiment according to any one of the surface light source devices mentioned above, the optical sheet is configured such that a ratio of the through holes per unit area in a region directly above the respective one of the light sources is smaller than a ratio of the through holes per unit area in a region other than the region directly above the respective one of the light sources. Here, the hole diameters of the through holes are designed to be smaller in the regions directly above the light sources due to the fact that the amount of the light reaching there tends to be larger and the luminance there tends to be higher than the other regions, and thus the transmittance (light transmittance) of the regions directly above the light sources can be decreased by decreasing the ratio of the through holes per unit area. As a result, by decreasing the transmittance of the regions directly above the light sources, it is possible to suppress the luminance from being larger than the other regions, which makes the luminance more uniform.

(8) In accordance with a preferred embodiment according to any one of the surface light source devices mentioned above, the optical sheet is configured such that the hole diameter of the at least one second through hole has a size that differs from the hole diameter set according to the distance from the respective one of the light sources by one or several levels.

(9) In accordance with a preferred embodiment according to any one of the surface light source devices mentioned above, the at least one second through hole includes a pair of second through holes that are formed by mutually interchanging a pair of through holes with hole diameters that are different from each other by one or several levels. With this configuration, the hole diameter of a portion of the through holes is mutually interchanged with a hole diameter of a through hole that differs by one or several levels, for example. By mutually interchanging the hole diameter of the portion of the through holes with the hole diameter of the through hole that differs by one or several levels, the amount of the light transmitted through the through holes can be partially changed, which makes it possible to suppress the occurrence of the luminance unevenness.

(10) In accordance with a preferred embodiment according to any one of the surface light source devices mentioned above, the optical sheet have a through hole having the smallest hole diameter among the through holes of the optical sheet or have no through hole in a region directly above the respective one of the light sources.

(11) In accordance with a preferred embodiment according to any one of the surface light source devices mentioned above, the first through holes have same first hole diameter in a region of the optical sheet defined between concentric rectangles centered on a position of the respective one of the light sources, and the at least one second through hole is located in the region of the optical sheet defined between the concentric rectangles centered on the position of the respective one of the light sources and has a second hole diameter that is different from the first hole diameter.

(12) In accordance with a preferred embodiment according to any one of the surface light source devices mentioned above, the second hole diameter of the at least one second through hole is larger than the first hole diameter of the first through holes.

(13) In accordance with a preferred embodiment according to any one of the surface light source devices mentioned above, the second hole diameter of the at least one second through hole is smaller than the first hole diameter of the first through holes.

(14) In view of the state of the known technology and in accordance with a second aspect of the present invention, a display device comprises any one of the surface light source devices mentioned above, and a display arranged to face the diffusion plate and disposed on an opposite side relative to the optical sheet. For example, the display device comprises a plurality of light sources, an optical sheet, a diffusion plate, and a display. The optical sheet is arranged to face the light sources, the optical sheet including a transmission part having a plurality of through holes that are configured to transmit light emitted from the light sources, and a reflection part configured to reflect the light emitted from the light sources. The diffusion plate is configured to diffuse the light transmitted through the transmission part, the diffusion plate being arranged to face the optical sheet and disposed on an opposite side relative to the light sources. The display is arranged to face the diffusion plate and disposed on an opposite side relative to the optical sheet. The optical sheet is configured such that the through holes include a plurality of first through holes each having a hole diameter set according to a distance from a respective one of the light sources, and at least one second through hole each having a hole diameter set to a different size from the hole diameter set according to the distance from the respective one of the light sources.

With this display device, the hole diameter of the first through holes is set according to the distance from the light source. This makes it possible to adjust the amount of light transmitted through the transmission part according to the amount of light reaching the transmission part, which makes the luminance uniform. Also, by setting the hole diameter of the at least one second through hole of the optical sheet to a different size from the hole diameter set according to the distance from the respective one of the light sources, the amount of light transmitted through the through holes can be partially changed in a part of a region where the distance from the light source is constant or the same, which makes it less likely to recognize concentric luminance unevenness. As a result, it is possible to provide the display device that can make luminance uniform and suppress the occurrence of luminance unevenness.

(15) In view of the state of the known technology and in accordance with a third aspect of the present invention, an optical sheet manufacturing method is a method for manufacturing an optical sheet that includes a transmission part having a plurality of through holes that are configured to transmit light emitted from a light source, and a reflection part configured to reflect the light emitted from the light source. The optical sheet manufacturing method comprises providing, using a first tool, a plurality of first through holes each having a hole diameter set according to a distance from a position where the light source in a part of a region of the optical sheet, and providing, using a second tool, at least one second through hole each having a hole diameter set to a different size from the hole diameter set according to the distance from the light source in another part of the region of the optical sheet.

The optical sheet manufacturing method comprises providing, using the first tool, the first through holes each having the hole diameter set according to the distance from the position where the light source is located. This makes it possible to provide the first through holes whose hole diameters are adjusted according to the amount of light reaching the transmission part of the optical sheet to the optical sheet, and thus makes it possible to manufacture the optical sheet with uniform luminance. Furthermore, by comprising providing, using the second tool, the at least one second through hole each having the hole diameter set to a different size from the hole diameter set according to the distance from the position where the light source is located, it is possible to provide a through hole with a luminance that differs from a luminance of the surrounding area only in a part of a region where the distance from the light source is constant or the same, and thus it is possible to manufacture an optical sheet on which concentric luminance unevenness less likely occurs. As a result, it is possible to manufacture an optical sheet that can make luminance uniform and suppress the occurrence of luminance unevenness.

(16) In accordance with a preferred embodiment according to any one of the surface light source devices mentioned above, the optical sheet is configured such that, in each of sections of the optical sheet centered on positions of the light sources, respectively, the through holes are arranged relative to each other in a matrix.

(17) In accordance with a preferred embodiment according to any one of the surface light source devices mentioned above, the optical sheet is configured such that, in each of the sections of the optical sheet, the through holes are arranged in a plurality of rows each having the same number of through holes and in a plurality of columns each having the same number of through holes.

(18) In accordance with a preferred embodiment according to any one of the surface light source devices mentioned above, the at least one second through hole includes a pair of second through holes that are formed by mutually interchanging a pair of through holes with hole diameters set according to the distance from the respective one of the light sources by one or several levels.

(19) In accordance with a preferred embodiment according to any one of the display devices mentioned above, the optical sheet is configured such that, in each of sections of the optical sheet centered on positions of the light sources, respectively, the hole diameter of the first through holes increases as moving away from the respective one of the light sources, and the hole diameter of the at least one second through hole is set to be smaller than that of an adjacent through hole on a light source side or is set to be larger than that of an adjacent through hole on an outer edge side. With this configuration, by providing the first through holes such that the hole diameter of the first through holes increases as moving away from the respective one of the light sources, and by providing the at least one second through hole such that the hole diameter of the at least one second through hole is set to be smaller than that of the adjacent through hole on the light source side, or is set to be larger than that of the adjacent through hole on the outer edge side, the luminance only at a part of the optical sheet is increased or decreased, which makes it possible to further suppress the occurrence of luminance unevenness.

(20) In accordance with a preferred embodiment according to any one of the display devices mentioned above, the optical sheet is configured such that the hole diameter of the at least one second through hole is set to a different size from the hole diameter set according to the distance from the respective one of the light sources so as to partially change luminance to suppress luminance unevenness. With this configuration, the hole diameter of the at least one second through hole is provided so as to partially change luminance to suppress luminance unevenness, which makes it possible to reliably suppress the occurrence of luminance unevenness.

According to the present invention, as described above, it is possible to provide a surface light source device, a display device, and an optical sheet manufacturing method that can make luminance uniform and suppress the occurrence of luminance unevenness.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a display device in an upright position. Accordingly, these directional terms, as utilized to describe the display device should be interpreted relative to a display device in an upright position.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A surface light source device comprising:
 a plurality of light sources;
 an optical sheet arranged to face the light sources, the optical sheet including a plurality of sections, each section centered on one of the light sources, wherein each section includes a transmission part having a plurality of through holes that are configured to transmit light emitted from the light sources, and a reflection part configured to reflect the light emitted from the light sources; and a diffusion plate configured to diffuse the light transmitted through the transmission part, the diffusion plate being arranged to face the optical sheet and disposed on an opposite side relative to the light sources, wherein each section of the optical sheet comprises a plurality of regions formed between concentric rectangles centered on its respective light source, the plurality of regions each comprising a plurality of first through holes in each one of the regions, each first through hole having a hole diameter set according to a distance it is from the respective light source, and at least one second through hole each having a hole diameter set to a different size from the hole diameter of the first through holes.

2. The surface light source device according to claim 1, wherein
the optical sheet is configured such that, in each section of the optical sheet, the hole diameter of the first through holes increases as moving away from the respective light source, and the hole diameter of the at least one second through hole is smaller than that of an adjacent through hole on a light source side or is larger than that of an adjacent through hole on an outer edge side.

3. The surface light source device according to claim 1, wherein
the optical sheet is configured such that the hole diameter of the at least one second through hole is set to a different size from the hole diameter of the first through holes so as to partially change luminance to suppress luminance unevenness.

4. The surface light source device according to claim 1, wherein
the optical sheet is configured such that outer ones of the through holes are arranged along an outer edge of the optical sheet and have the largest hole diameter among the through holes of the optical sheet.

5. The surface light source device according to claim 1, wherein
the light sources are arranged relative to each other in a matrix, and
the optical sheet is configured such that the first through holes are arranged along a straight line in a direction parallel or perpendicular to a direction in which the light sources are arranged, and such that the at least one second through hole includes a plurality of second through holes that are arranged in a curved shape or a V-shape and are offset with respect to the straight line along which the first through holes are arranged.

6. The surface light source deice according to claim 5, wherein
the first through holes are arranged along the straight line such that centers of the first through holes are aligned along the straight line, and
the second through holes are offset with respect to the straight line such that centers of the second through holes are offset with respect to the straight line.

7. The surface light source device according to claim 1, wherein
the optical sheet is configured such that a ratio of the through holes per unit area in a region directly above the respective light source is smaller than a ratio of the through holes per unit area in a region other than the region directly above the respective light source.

8. The surface light source device according to claim 1, wherein
the optical sheet is configured such that the hole diameter of the at least one second through hole has a size that differs from the hole diameter of the first through holes by one or several levels.

9. The surface light source device according to claim 8, wherein
the at least one second through hole includes a pair of second through holes that are formed by mutually interchanging a pair of through holes with hole diameters that are different from each other by one or several levels.

10. The surface light source device according to claim 1, wherein
the optical sheet have a through hole having the smallest hole diameter among the through holes of the optical sheet or have no through hole in a region directly above the respective light source.

11. The surface light source device according to claim 1, wherein
the first through holes have same first hole diameter in each one of the regions of the optical sheet, and
the at least one second through hole has a second hole diameter that is different from the first hole diameter.

12. The surface light source device according to claim 11, wherein
the second hole diameter of the at least one second through hole is larger than the first hole diameter of the first through holes.

13. The surface light source device according to claim 11, wherein
the second hole diameter of the at least one second through hole is smaller than the first hole diameter of the first through holes.

14. A display device comprising:
the surface light source device according to claim 1; and
a display arranged to face the diffusion plate and disposed on an opposite side relative to the optical sheet.

15. An optical sheet manufacturing method for manufacturing an optical sheet configured to be arranged to face a plurality of light sources, the optical sheet including a plurality of sections, each section centered on one of the light sources, wherein each section includes a transmission part having a plurality of through holes that are configured to transmit light emitted from a light source, and a reflection part configured to reflect the light emitted from the light source, and comprises a plurality of regions formed between concentric rectangles centered on its respective light source, the optical sheet manufacturing method comprising:
providing, using a first tool, a plurality of first through holes in each one of the regions, each first through hole having a hole diameter set according to a distance it is from the respective light source; and
providing, using a second tool, at least one second through hole each having a hole diameter set to a different size from the hole diameter of the first through hole.

16. The surface light source device according to claim 1, wherein
the optical sheet is configured such that, in each section of the optical sheet, the through holes are arranged relative to each other in a matrix.

17. The surface light source device according to claim 16, wherein the optical sheet is configured such that, in each section of the optical sheet, the through holes are arranged in a plurality of rows each having the same number of through holes and in a plurality of columns each having the same number of through holes.

18. The surface light source device according to claim 8, wherein the at least one second through hole includes a pair of second through holes that are formed by mutually interchanging a pair of through holes with hole diameters set according to distances they are from the respective light source.

19. The display device according to claim 14, wherein the optical sheet is configured such that, in each section of the optical sheet, the hole diameter of the first through holes increases as moving away from the respective light source, and the hole diameter of the at least one second through hole is smaller than that of an adjacent through hole on a light source side or is larger than that of an adjacent through hole on an outer edge side.

20. The display device according to claim 14, wherein the optical sheet is configured such that the hole diameter of the at least one second through hole is set to a different size from the hole diameter set of the first through holes so as to partially change luminance to suppress luminance unevenness.

21. The surface light source device according to claim 1, wherein at least one second through hole includes a plurality of second through holes each having a hole diameter set to a different size from the hole diameter of the first through holes, the position of each second through hole being determined as a function of its distance from the respective light source and the positions of the first through holes.

* * * * *